Sept. 29, 1964  A. ROTHE  3,150,784
DISPLACEABLE LIFTING PLATFORM FOR AUTOMOTIVE VEHICLES
Filed Sept. 5, 1962  2 Sheets-Sheet 1
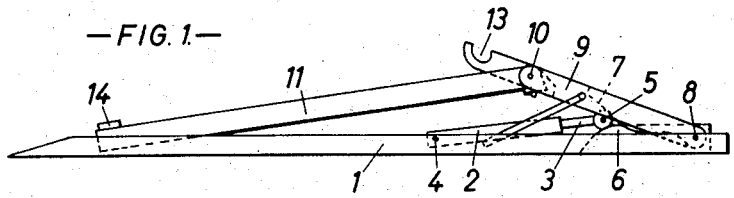
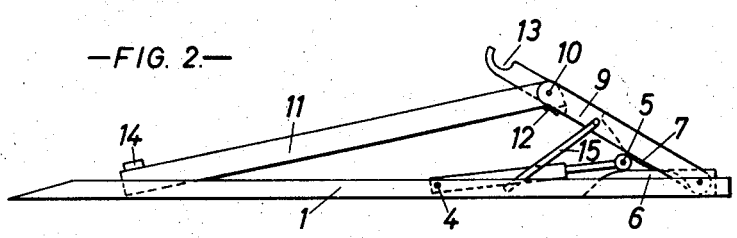
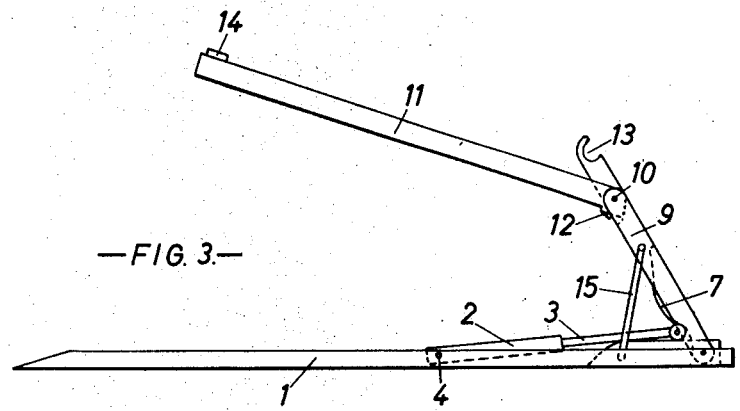
INVENTOR:
ARTHUR ROTHE
BY
Attorney

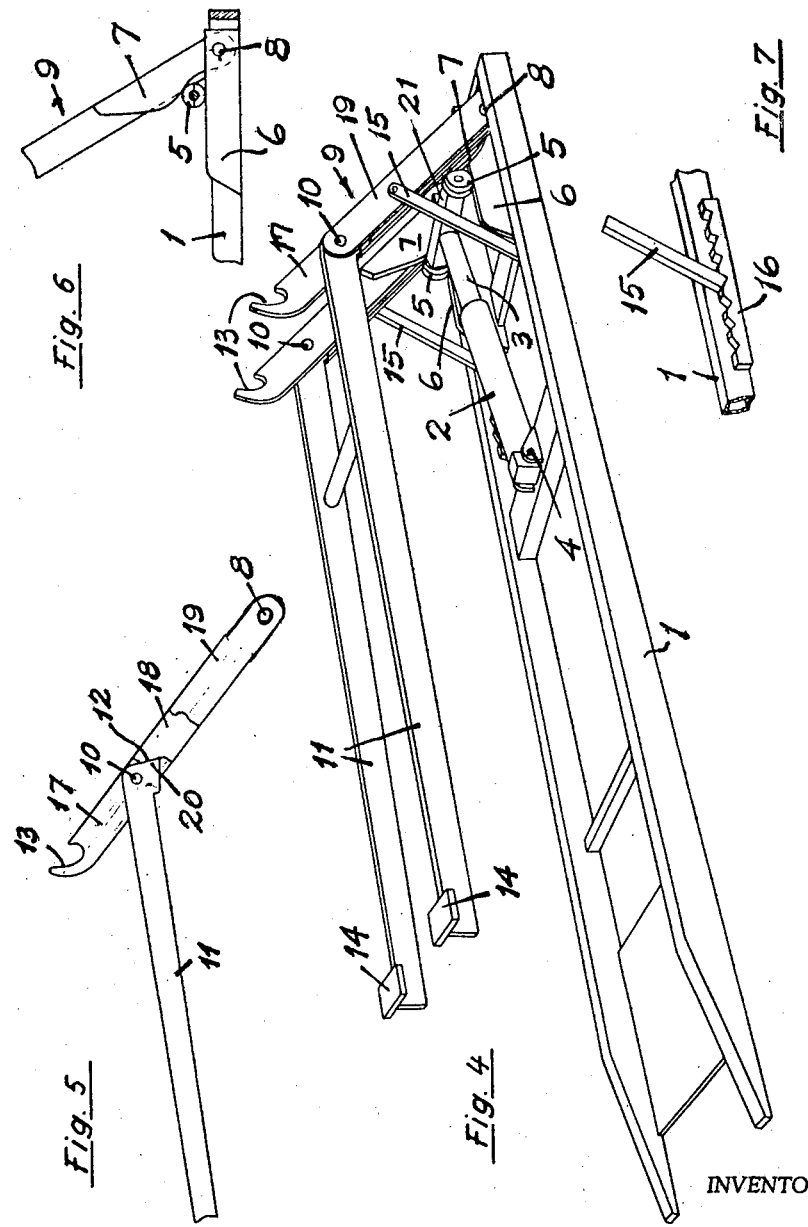

United States Patent Office 3,150,784
Patented Sept. 29, 1964

3,150,784
DISPLACEABLE LIFTING PLATFORM FOR AUTOMOTIVE VEHICLES
Arthur Rothe, Bremen, Germany, assignor to Focke-Wulf Gesellschaft mit beschraenkter Haftung, Bremen-Flughafen, Germany
Filed Sept. 5, 1962, Ser. No. 221,510
Claims priority, application Germany, Apr. 27, 1962, F 36,649
7 Claims. (Cl. 214—1)

The present invention concerns a displaceable lifting platform for automotive vehicles.

Displaceable lifting platforms for automotive vehicles which are adapted to be stowed away, in a space saving manner, are known. Such platforms are of the type which are adapted to lift a car and cause it to assume an inclined position convenient for inspection thereof, servicing and maintenance of the chassis. Thus either the front of the car is raised higher than the rear or vice versa, so that the person servicing the car faces the work instead of finding it situated above him. Known platforms or jacks of this kind comprise a basic frame having a supporting frame journalled to one side of this frame, which supporting frame is adapted to be swung upwards and downwards again by means of a hydraulic or electric drive. In cars where the front or the rear projects considerably beyond the running wheel axles, the swinging range of the supporting frame cannot be fully utilized on flat ground, so that the raised portion of the car does not reach the necessary convenient height for carrying out work.

Displaceable lifting platforms in the lowered state require such a low overall height that they can also be run beneath cars having a relatively small clearance from the ground. In order to obtain this, it has already been proposed for the supporting frame to be so arranged that, in the lowered state, it rests in the plane of the basic frame. Since it is however also necessary for the driving elements, e.g. pressure ram, to be horizontally arranged within the defining planes determined by the basic frame, an unfavourable force moment results at the beginning of the working stroke.

In vehicles which only have a small ground clearance the force moment of a pressure ram horizontally arranged in the basic frame and which engages on the supporting frame to be raised, can become so unfavourable that it is no longer possible for the pressing ram to be articulated directly to the supporting frame. It must be taken into consideration that the vehicle with all its weight has to be carried almost directly the lifting movement commences without having an initially short idling distance available to produce a relatively favourable force engaging angle.

In connection with so-called shear lifting tables it is known to arrange a pressing ram horizontally in the base frame in such a manner that it acts directly by means of a crosshead and pressing rollers against a supporting frame carrying the erectable table top, which frame is pivotally connected to the base frame. The base frame in known lifting tables has stop wedges arranged in pairs and the erectable supporting frame has stop cam members arranged in pairs and associated with the wedge members. When the pressing ram pivotally mounted in the base frame is run out substantially horizontally, the pressing rollers are supported downwards against the fixed stop wedges and upwardly against the stop cam members of the erectable supporting frame. Although in this case a comparatively high operational pressure in the pressure cylinder is provided, the lifting movement, in the case of a very low overall height of the collapsed lifting platform, can however be reliably controlled immediately lifting commences with a horizontal pressing ram.

The invention makes use of this fact and employs a pressing ram pivotally mounted in the base frame and substantially horizontally disposed, which via wedge members and cam members acts on a load arm adapted to be erected under load over the whole lifting distance.

A condition required of lifting platforms for automotive vehicles of up to date construction is that the car should be retained both inclined to the front and the rear or also in a horizontal position, and that the lifting platform is displaceable having the lowermost overall height in the retracted state. In order to obtain the possibility of adjustment, the load arm adapted to receive the weight of the car is divided by means of a stop limited hinge joint extending parallel to the pivotal axis provided in the base frame thereof. The part hingedly connected with the base frame is kept substantially shorter than the other part adapted to receive the car, which corresponds approximately to the length of a car.

Thus, if as described the short load arm is swung upwards from the resting position by means of wedge members and/or stop cam members, then the outer end of the long load arm part at first remains on the ground until the range of the angle of bend is exhaused owing to the stop. With progressive lifting movement the long load arm part, with the car resting thereon is then lifted off the ground and first remains in an inclined position, then passes through the horizontal position and finally assumes an inclined position which is opposite to the initial inclined position.

In this way it is possible to design a displaceable lifting platform for automotive vehicles having a very low overall height when not in use in such a manner that the initial lifting movement can be reliably controlled and that by simple pressure application or pressure releases the raised car can be caused to assume an inclined position with the front or the rear lifted up or in a horizontal position with adequate overall height for working.

The invention will now be described further, by way of example, with reference to the accompanying drawings, in which:

FIG. 1 is a side elevation of a lifting platform with slightly raised load receiving member;

FIG. 2 is a side elevation of the lifting platform shown in FIG. 1 with load receiving member raised relative thereto;

FIG. 3 is a side elevation of the lifting platform with completely raised load receiving member and adjusted at an angle inclined to the horizontal.

FIGURE 4 is a perspective view of the assembled jack with the lift arms in partially-elevated position.

FIGURE 5 is a detail broken view showing the stop mechanism between the load arms and supporting arms;

FIGURE 6 is a detail view partly in section, showing the wedge and cam members and their relation with the frame and load arm; and FIGURE 7 is a detail perspective view showing one of the two safety supports and the cooperating rack bar.

A working cylinder comprising a cylinder 2 and piston rod 3 is pivotally mounted at a point 4 on a rectangular base frame 1 so as to be pivoted upwardly and downwardly into a horizontal position. The head of the rod 3 carries a crosshead 21. Two pressure rollers 5 are journaled on each end of crosshead 21. When rod 3 is extended, one of the pressure rollers rides upwardly over a wedge or cam member 6 fixed on the base frame, whilst the other pressure roller forces upwardly a cam member 7 which is rigidly connected to an erectable, i.e. short load arm 9 adapted to pivot on the base frame 1 at a point 8. Each load arm 9, of which there are two, is a built-up unit which, referring more particularly to FIG. 5, consists of a link or first part 17 extending radially from pivot 8 beyond pivot 10 and having load lifting means or hooks 13 formed in its distal end. An intermediate link or part 18 extends from pivot 8 in side-by-side relation with part 17 and terminates just short of pivot 10. The end of this part 18, as shown upon FIG. 5, has an abutment or stop 12 inclined at about 45° to its longitudinal axis. A third link or part 19 extends from pivot 8 to pivot 10. These parts 17, 18 and 19 are rigidly united as by riveting or welding and have aligned apertures at their inner or base ends to receive pivot 8. Likewise parts 17 and 19, at their radially outward portions, have aligned apertures to receive pivot 10 on which is pivotally mounted the contiguous end of a lever 11 of which there are two in the complete instrument. The aforesaid end of each lever 11 is formed with a short radial abutment, or nose 20, so constructed and arranged, as clearly depicted upon FIG. 5, that it is engaged by abutment 12 only after arm 9 has pivoted clockwise, as viewed upon FIG. 5, to the position there shown. Further rotation of arm 9 in the same direction due to interengagement of abutments 12 and 20, causes interconnected arms 11 to rise as a unit with arms 9 about the axis of pivots 8 and in their fully elevated positions, shown upon FIG. 3, are substantially above arms 9, with pads 14 materially elevated above hooks or gripping members 13. On the other hand, when arms 9 are pivoted counterclockwise about the axis of pivots 8, from the position of FIG. 5, arms 11 are free to pivot clockwise relatively to arms 9, about the axis of pivots 10 until, in the fully collapsed position, arms 9 and 11 are coplanar and lie between the sides or stringers of base frame 1. As previously described, each of the two rigidly-interconnected arms 11 is pivoted on a common axis 10 on the distal end of a respective arm 9. The swivel range of the parts 9 and 11 however is limited by stops 12, FIG. 5, to a relatively small angle. The arm 9 is extended beyond the pivot axis 10. Gripping members 13 serve to receive a car axle, preferably the rear axle. When these gripping members 13 are moved upwardly, the ends of the long supporting arm 11 provided with adjustable receiving pads 14 for the other car axle remain at first on the ground and, when reaching the stops 12, are lifted off the ground. With progressive lifting of the gripping members 13, the supporting arms 11 are caused to assume a horizontal position as shown upon FIG. 4, and finally assume an inclined position as shown in FIG. 3 having an inclination opposite to the initial inclined position shown in FIG. 1.

For reasons of safety, a support 15, FIG. 7, is journalled on both sides of the short load arm 9, which supports engage in notches in a horizontal rack bar 16 fixed to the base frame, in order effectively to prevent the load arm 9, 11 from dropping back accidentally with a sudden pressure loss of the pressure cylinder.

Both arms 9 extend beyond pivots 10 and serve as a support for a vehicle axle. The result is that the other vehicle axle with the support pads 14 in the longitudinal direction of the arms 11 is somewhat displaced during the lifting movement.

In place of special cam members 7 it is also possible to use cam tracks or bevel surfaces machined in the short load arm part 9 by suitably shaping the lateral stringers. The wedge members 6 are fixed to the insides of the base frame and so arranged that the arms 9 are disposed within the base frame when not in use. The parts 9 and 11 then assume an extended position within and along the horizontal side members of frame 1.

I claim:

1. In a lift for vehicles, a base defining a normally-horizontal plane, a pair of rigidly interconnected laterally-spaced parallel load arms each pivoted at one end, on a common, normally-horizontal first axis, to one end of said base, each said load arm having first vehicle-engaging lift means at its distal end, first and second, laterally-spaced, rigidly interconnected support arms, each pivoted at one end thereof on a common horizontal second axis to a respective one of said load arms, between the ends thereof, second vehicle-engaging lift means carried by the other ends of said support arms, interengaging abutment means carried by said arms adjacent said second axis, and interengaging and pivoting said support arms as a unit with said load arms, about said first axis, only after said load arms have pivoted through a substantial angle about said first axis, out of the plane of said base, and hydraulic pressure fluid means carried by said base and acting upon said load arms to pivot the same out of said plane in response to introduction of pressure fluid thereinto.

2. The lift of claim 1, each said load arm comprising first and second rigidly-connected, spaced, parallel links, said first link extending beyond said second axis in a direction away from said first axis and carrying said first vehicle-engaging lift means at its distal end, said second link extending between said pivot axes only, said interengaging abutment means comprising an abutment surface fixed with and interposed between said first and second links of each load arm, parallel with and adjacent said second axis, and a nose fixed with each said support arm adjacent said abutment second axis, said surface engaging and pivoting the nose of its respective support arm, only after said load arms have pivoted to elevate said first lift means upwardly above said base, and to thereafter pivot all said arms as a unit about said first axis.

3. The lift of claim 1, each said load arm comprising three rigidly-connected links, said first link extending beyond said second axis in a direction away from said first axis and carrying said first vehicle lift means, said second link extending between said pivot axes, and said third link being interposed between said first and second links, said interengaging abutment means comprising a downwardly-facing surface on said third link, said surface being inclined at an angle with the longitudinal axis of said links, and a nose integral with the contiguous end of each said support arm and engaged by the respective surface of said load arm, only after said load arms have initially pivoted out of the plane of said base, to thereafter cause all said arms to pivot as a unit about said first axis, whereby said load arms may be selectively pivoted to position said second vehicle lift means at lesser, equal and greater elevations about said base, than said first vehicle lift means.

4. In a lift for vehicles, a base defining a normally horizontal plane, first and second interconnected parallel laterally-spaced load arms each pivoted at one end thereof, to one end of said base, for pivoting about a common first axis from a collapsed first position parallel with said plane to a second position with its distal end elevated above said plane, first vehicle-lift means carried by the distal ends of said load arms, first and second, laterally-spaced, rigidly-interconnected support arms each pivoted at one end thereof, on a common second axis, to a respective one of said load arms, between the ends thereof, second vehicle-lift means carried by the distal ends of said support arms, abutment means fixed with said load and support arms adjacent said second axis and interengaging only after said load arm has been pivoted from its said first position to a position short of said second position, to thereafter cause all said arms to pivot as a unit about said first axis, in the lift direction.

5. The lift of claim 4, said first vehicle lift means being adapted to engage and lift one end of a vehicle, said second vehicle lift means being adapted to simultaneously engage and lift the other end of said vehicle, and power means interconnected between said base and load arms to pivot the same about said first axis toward and into said second position.

6. The lift of claim 5, said power means comprising a hydraulic cylinder assembly mounted at one end on said base for pivoting about a third axis parallel with and offset from said first axis, and including a piston rod and crosshead fixed to and transversely of said rod, a first pair of cam plates each fixed to said base, a second pair of cam plates each fixed to a respective one of said load arms, all said plates being adjacent and normal to said first axis, and first and second pairs of cam rollers each said pair of rollers being journaled on a respective end of said crosshead, one roller of each pair engaging a respective plate of said first pair and the other roller of said pair engaging a respective plate of said second pair, translation of said crosshead toward said first axis effecting pivoting of said load arms in the lift direction.

7. In a lift for vehicles, a base including first and second, laterally-spaced parallel rigidly interconnected stringers, a pair of interconnected parallel load arms each pivoted at one end, on a common first axis, to a corresponding end of a respective one of said stringers, each said load arm having vehicle-engaging lift means at its other end, first and second, laterally-spaced, rigidly interconnected support arms, each pivoted at one end thereof, on a common axis, to a respective one of said load arms, between the ends thereof, vehicle lift pads carried by the distal ends of each said support arm, means at the pivot between each said load arm and its respective support arm engaging and pivoting said support arms, only after said load arms have pivoted through a substantial angle out of a position coplanar with said base, and hydraulic fluid pressure means connected between said base and said load arms to pivot the latter about said first axis.

References Cited in the file of this patent

UNITED STATES PATENTS

| | | |
|---|---|---|
| 1,942,945 | Smith | Jan. 9, 1934 |
| 2,480,916 | Gibson | Sept. 6, 1949 |
| 2,611,579 | Guzey et al. | Sept. 23, 1952 |
| 2,790,683 | Clark | Apr. 30, 1957 |
| 2,922,533 | La Barge | Jan. 26, 1960 |
| 2,928,558 | Bamford et al. | Mar. 15, 1960 |